US011818821B2

(12) United States Patent
Maddali et al.

(10) Patent No.: US 11,818,821 B2
(45) Date of Patent: Nov. 14, 2023

(54) AUTONOMOUS LIGHT SYSTEMS AND METHODS FOR OPERATING AUTONOMOUS LIGHT SYSTEMS

(71) Applicant: GOODRICH CORPORATION, Charlotte, NC (US)

(72) Inventors: Yaswanth Kumar Maddali, Telangana (IN); Bhavya Chunchu, Karnataka (IN)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 0 days.

(21) Appl. No.: 17/668,114

(22) Filed: Feb. 9, 2022

(65) Prior Publication Data

US 2023/0052426 A1 Feb. 16, 2023

(30) Foreign Application Priority Data

Aug. 12, 2021 (IN) .............................. 202141036560

(51) Int. Cl.
| | |
|---|---|
| H05B 47/12 | (2020.01) |
| G06V 40/19 | (2022.01) |
| F21V 14/02 | (2006.01) |
| H05B 47/125 | (2020.01) |
| G06V 20/59 | (2022.01) |
| G06V 40/18 | (2022.01) |
| F21W 107/30 | (2018.01) |
| B64D 11/00 | (2006.01) |

(52) U.S. Cl.
CPC ........... *H05B 47/125* (2020.01); *F21V 14/02* (2013.01); *G06V 20/593* (2022.01); *G06V 40/193* (2022.01); *B64D 2011/0053* (2013.01); *F21W 2107/30* (2018.01)

(58) Field of Classification Search
None
See application file for complete search history.

(56) References Cited

U.S. PATENT DOCUMENTS

| | | | |
|---|---|---|---|
| 10,129,954 B2 | 11/2018 | Despres | |
| 10,144,512 B2* | 12/2018 | Gagnon | ................. B63B 29/02 |
| 10,940,790 B1* | 3/2021 | Mazuir | .................... F21V 14/04 |
| 2015/0035437 A1 | 2/2015 | Panopoulos et al. | |
| 2016/0195856 A1 | 7/2016 | Spero | |
| 2022/0306316 A1* | 9/2022 | Jha | ........................... A62B 7/14 |

FOREIGN PATENT DOCUMENTS

DE 102015010052 5/2016

OTHER PUBLICATIONS

European Patent Office, European Search Report dated Dec. 12, 2022 in Application No. 22190223.2.

* cited by examiner

*Primary Examiner* — Dedei K Hammond
(74) *Attorney, Agent, or Firm* — SNELL & WILMER L.L.P.

(57) ABSTRACT

An autonomous light system may comprise a reading light assembly, an object detection device; and a controller. The reading light assembly may include a light source and an actuation system. The controller may be operably coupled to the light source and the object detection device. The controller may include an object detection module and may be configured to receive object data from the object detection device, compare the object data against an object database, identify an object based on the comparison of the object data to the object database, send a first command to at least one of the light source and the actuation system.

18 Claims, 8 Drawing Sheets

AUTONOMOUS LIGHT SYSTEMS AND METHODS FOR OPERATING AUTONOMOUS LIGHT SYSTEMS

CROSS-REFERENCE TO RELATED APPLICATIONS

This application claims priority to, and the benefit of, India Patent Application No. 202141036560, filed Aug. 12, 2021 and titled "AUTONOMOUS LIGHT SYSTEMS AND METHODS FOR OPERATING AUTONOMOUS LIGHT SYSTEMS," which is incorporated by reference herein in its entirety for all purposes.

FIELD

The present disclosure relates generally to light assemblies and, more particularly, to autonomous light systems for aircraft and methods for operating autonomous light systems.

BACKGROUND

Modern aircraft typically include passenger reading lights located throughout the aircraft cabin. For example, each seat may have a dedicated reading light located in the ceiling panel over the seat. The passenger reading lights are manually operated (e.g., the passenger manually turns the light on/off, positions the light at a desired angle, and/or selects the desired brightness). For shorter passengers or children manually manipulating the light may require the passenger to stand-up or otherwise unfasten his/her seatbelt to reach the light. This can place the passenger in an unsafe position. Further, pathogens may be present on contact surfaces of an aircraft cabin and can spread to passengers and/or crew members through contact with the surface. The safety of passengers and crew members may be improved by reducing the number of surfaces a passenger directly contacts (e.g., touches) during a flight.

SUMMARY

An autonomous light system is disclosed herein. In accordance with various embodiments, the autonomous light system comprises a reading light assembly, an object detection device, and a controller. The reading light assembly includes a light source and an actuation system configured to change a positioning of the light source. The controller is operably coupled to the light source and the object detection device. The controller may include an object detection module. A tangible, non-transitory memory is configured to communicate with the controller. The tangible, non-transitory memory has instructions stored thereon that, in response to execution by the controller, cause the controller to perform operations, which may comprise receiving, by the controller, object data from the object detection device; comparing, by the controller, the object data against object feature data stored in an object database; identifying, by the controller, an object based on the comparison of the object data to the object feature data; and sending, by the controller, a first command to at least one of the light source and the actuation system.

In various embodiments, the object identified by the controller may be at least one of a book, a magazine, a newspaper, a tray table in a down position, and an electronic display. In various embodiments, identifying, by the controller, the object based on the comparison of the object data against the object database comprises determining, by the controller, if a seat occupant's eyes are in an open state or a closed state. In various embodiments, if the controller determines the seat occupant's eyes are closed, the first command causes the light source to turn off.

In various embodiments, an ambient light sensor is in operable communication with the controller. In various embodiments, the operations may further comprise receiving, by the controller, light data from the ambient light sensor; and sending, by the controller, at least one of an increase brightness command and a decrease brightness command to the light source based on the light data.

In various embodiments, sending, by the controller, the first command to the at least one of the light source and the actuation system comprises commanding, by the controller, the light source to follow the object. In various embodiments, commanding, by the controller, the light source to follow the object comprises sending, by the controller, actuation commands to the actuation system.

In various embodiments, the actuation system may comprise an actuation plate coupled to the light source, a first actuator, a second actuator, a third actuator, and a fourth actuator each configured to translate the actuation plate. The second actuator may be located approximately 90° apart from the first actuator relative to a center axis of the light source. The third actuator may be located approximately 180° apart from the first actuator relative to the center axis of the light source. The fourth actuator may be located approximately 180° apart from the second actuator relative to the center axis of the light source.

An article of manufacture including a tangible, non-transitory computer-readable storage medium having instructions stored thereon for controlling an autonomous light assembly is also disclosed herein. In accordance with various embodiments, the instructions, in response to execution by a controller, cause the controller to perform operations, which may comprise receiving, by the controller, object data from an object detection device; comparing, by the controller, the object data against object feature data stored in an object database; identifying, by the controller, an object based on the comparison of the object data to the object feature data; determining, by the controller, an ambient light brightness level based on a signal received from an ambient light sensor; and sending, by the controller, a first command to at least one of a light source and an actuation system based on the ambient light brightness level and the object identified by the comparison of the object data to the object feature data.

In various embodiments, the object identified by the controller may be at least one of a book, a magazine, a newspaper, a tray table in a down position, and an electronic display. In various embodiments, identifying, by the controller, the object based on the comparison of the object data against the object database may comprise determining, by the controller, if a seat occupant's eyes are in an open state or a closed state.

In various embodiments, sending, by the controller, the first command may comprise at least one of sending, by the controller, an increase brightness command to the light source if the eyes are in the open state; and sending, by the controller, a decrease brightness command to the light source if the eyes are in the closed state.

In various embodiments, sending, by the controller, the first command may comprise at least one of sending, by the controller, an increase brightness command to the light source if the object is at least one of a book, a magazine and a newspaper; and sending, by the controller, a decrease brightness command to the light source if the object comprises an electronic display.

In various embodiments, sending, by the controller, the first command to the at least one of the light source and the actuation system may comprise commanding, by the controller, the light source to follow the object. In various embodiments, commanding, by the controller, the light source to follow the object comprises sending, by the controller, actuation commands to the actuation system.

In various embodiments, commanding, by the controller, the light source to follow the object may further comprise determining, by the controller, an angle of a center axis of the light source relative to an axis; and comparing, by the controller, the angle to a limit angle.

A reading light assembly for an autonomous light system is also disclosed herein. In accordance with various embodiments, the reading light assembly comprises a light source and an actuation system configured to control a positioning of the light source based on commands received from a controller of the autonomous light system.

In various embodiments, the actuation system may include an actuation plate coupled to the light source; and a first actuator coupled to the actuation plate. Translation of the actuation plate changes the positioning of the light source.

In various embodiments, the actuation system may further include a second actuator coupled to the actuation plate, a third actuator coupled to the actuation plate, and a fourth actuator coupled to the actuation plate. The second actuator may be located approximately 90° apart from the first actuator relative to a center axis of the light source. The third actuator may be located approximately 180° apart from the first actuator relative to the center axis of the light source. The fourth actuator may be located approximately 180° apart from the second actuator relative to the center axis of the light source.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
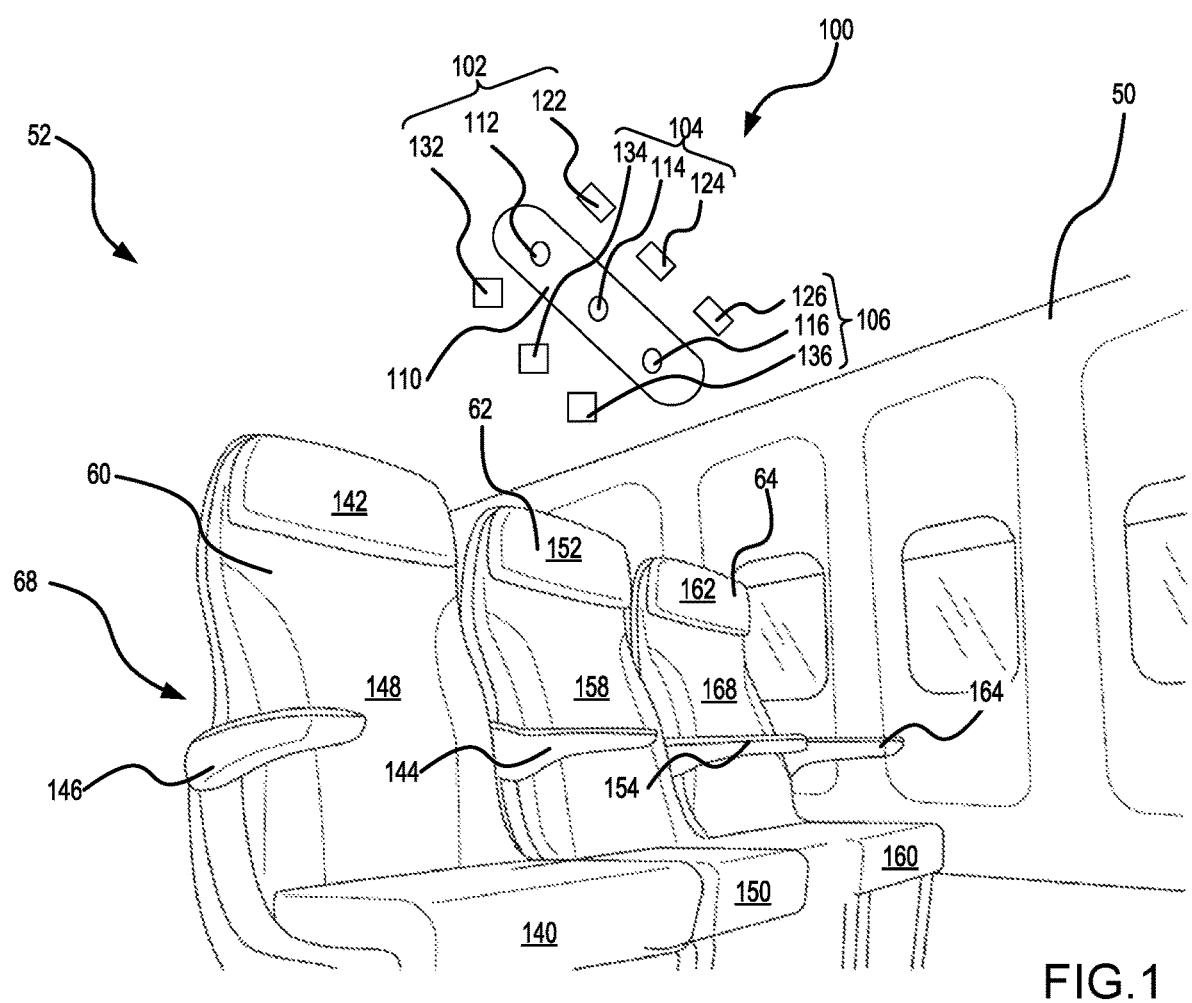
FIG. 1 illustrates a view of a cabin of an aircraft, in accordance with various embodiments.

With reference to FIG. 1, a portion of cabin 50 of an aircraft 52 is shown, according to various embodiments. The aircraft 52 may be any aircraft such as an airplane, a helicopter, or any other aircraft. For example, the cabin 50 may include passenger seats such as first seat 60, second seat 62, and third seat 64. First seat 60, second seat 62, and third seat 64 may be located in a row 68 of cabin 50. As will be discussed further below, an autonomous light system 100 may be installed in cabin 50. The autonomous light system 100 includes one or more autonomous light assemblies, such as first autonomous light assembly 102, second autonomous light assembly 104, and third autonomous light assembly 106. Each autonomous light assembly corresponds to a seat in a respective row in cabin 50. For example, first autonomous light assembly 102 may be configured to align towards first seat 60, second autonomous light assembly 104 may be configured to align towards a second seat 62, and third autonomous light assembly 106 may be configured to align towards third seat 64.

Each autonomous light assembly includes a reading light assembly and one or more object detection device(s). In this regard, first autonomous light assembly 102 includes a first reading light assembly 112 and first object detection device(s) 122, second autonomous light assembly 104 includes a second reading light assembly 114 and second object detection device(s) 124, and third autonomous light assembly 106 includes third reading light assembly 116 and third object detection device(s) 126. In various embodiments, first autonomous light assembly 102 may also include one or more first light sensor(s) 132, second autonomous light assembly 104 may also include one or more second light sensor(s) 134, and third autonomous light assembly 106 may also include one or more third light sensor(s) 136. In various embodiments, first reading light assembly 112, second reading light assembly 114, and third reading light assembly 116 may be incorporated/installed in a passenger service unit (PSU) 110 located in the ceiling above row 68.

First object detection device(s) 122, second object detection device(s) 124, and third object detection device(s) 126 may each include one or more camera(s) configured to capture and transmit a plurality of images or a video stream of images in a region of interest. First object detection device(s) 122, second object detection device(s) 124, and third object detection device(s) 126 may each also include one or more light detection and ranging (LiDAR) sensor(s), infrared sensor(s), depth sensor(s), 3D scanner(s), ultrasound range finder(s), radar sensor(s), and/or any other device capable of object detection within its respective region of interest. First light sensor(s) 132, second light sensor(s) 134, and third light sensor(s) 136 may each include one or more ambient light sensors or similar devices configured to detect a level or brightness of ambient light in the region of interest for the light sensor's respective autonomous light assembly. As used herein, "ambient light" refers to any light in cabin 50 that is not emitted by a component of autonomous light system 100.

In accordance with various embodiments, the region of interest for each autonomous light assembly (i.e., the region covered by the autonomous light assembly's objection detection device(s) and light sensor(s)) extends from the seat pan to the top of the headrest of the autonomous light assembly's respective seat, from the left armrest to the right armrest of the autonomous light assembly's respective seat, and from the seatback of the autonomous light assembly's respective seat to the back surface of the seatback directly in front of the autonomous light assembly's respective seat. For example, the region of interest for first autonomous light assembly 102 extends from seat pan 140 of first seat 60 to the top of headrest 142 of first seat 60, from armrest 144 of first seat 60 to armrest 146 of first seat 60, and from the seatback 148 of first seat 60 to the back surface of the seatback directly in front of first seat 60. The region of interest for second autonomous light assembly 104 extends from seat pan 150 of second seat 62 to the top of headrest 152 of second seat 62, from armrest 154 to armrest 144, and from the seatback 158 of second seat 62 to the back surface of the seatback directly in front of second seat 62. The region of interest for third autonomous light assembly 106 extends from seat pan 160 of third seat 64 to the top of headrest 162 of third seat 64, from armrest 164 to armrest 154, and from the seatback 168 of third seat 64 to the back surface of the seatback directly in front of third seat 64.

Figure 2:
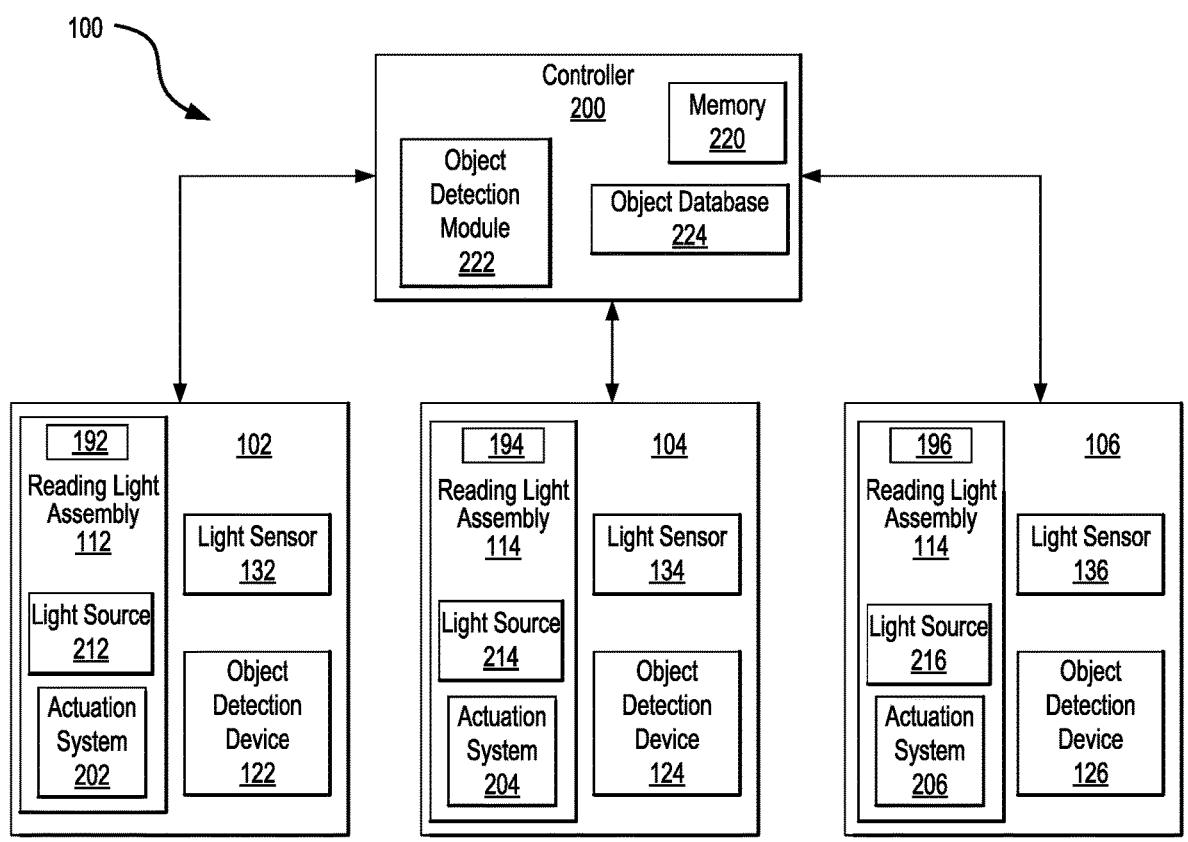
FIG. 2 illustrates a schematic view of autonomous light system, in accordance with various embodiments.

With additional reference to FIG. 2, a schematic of autonomous light system 100 is illustrated. In accordance with various embodiments, autonomous light system 100 includes a controller 200. Controller 200 is operably coupled to each of first autonomous light assembly 102, second autonomous light assembly 104, and third autonomous light assembly 106. In this regard, controller 200 receive and interpret object detection data output from first object detection device(s) 122, second object detection device(s) 124, and third object detection device(s) 126. Controller 200 is configured to receive and interpret ambient light data output from first light sensor(s) 122, second light sensor(s) 124, and third light sensor(s) 126.

In accordance with various embodiments, controller 200 is configured to send actuation commands to a first actuation system 202 of first reading light assembly 112 based on the data received from first object detection device(s) 122 and/or first light sensor(s) 122. Controller 200 is also configured to send light adjustment commands to a first light source 212 of first reading light assembly 112 based on the data received from first object detection device(s) 122 and/or from first light sensor(s) 122. Controller 200 is configured to send actuation commands to second actuation system 204 of second reading light assembly 114 based on the data received from second object detection device(s) 124 and/or from second light sensor(s) 124. Controller 200 is also configured to send light adjustment commands to one or more second light source(s) 214 of second reading light assembly 114 based on the data received from second object detection device(s) 124 and/or from second light sensor(s) 124. Controller 200 is configured to send actuation commands to third actuation system 206 of third reading light assembly 116 based on the data received from third object detection device(s) 126 and/or from third light sensor(s) 126. Controller 200 is also configured to send light adjustment commands to one or more third light source(s) 216 of third reading light assembly 116 based on the data received from second object detection device(s) 126 and/or from second light sensor(s) 126. In this regard, controller 200 is configured to determine from which autonomous light assembly the object detection and light level data is output and send commands to the corresponding reading light assembly.

Controller 200 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 200 may utilize one or more processors of any appropriate type/configuration, may utilize any appropriate processing architecture, or both). In various embodiments, the controller 200 may further include any non-transitory memory 220 known in the art. The memory 220 may store instructions usable by the logic device to perform operations. Any appropriate computer-readable type/configuration may be utilized as the memory 220, any appropriate data storage architecture may be utilized by the memory 220, or both.

Controller 200 further includes an object detection module 222 and an object database 224. In various embodiments, the object detection module 222 is configured to identify objects in the autonomous light assembly's region of interest by comparing object data received from the autonomous light assembly's object detection device against object feature data stored within object database 224. By way of example, object data obtained from first object detection device(s) 122 is transmitted to the object detection module 222 and analyzed against various object features stored within the object database 224. If, for example, an occupant of first seat 60 (FIG. 1) is holding a magazine, a book, a newspaper, or other piece of reading material, or if the tray table attached to seatback of the seat directly in front of first seat 60 is in a down position, and/or if food is located on the tray table, the object detection module 222 will identify the object (e.g., book, magazine, tray table, food on tray table, etc.) by accessing object database 224 and comparing features of the object image captured by first object detection device(s) 122 to the features of objects stored in object database 224.

In response to object detection module 222 identifying the object, controller 200 will command the first actuation system 202 to direct the first light source 212 at the identified object. In this regard, object detection module 222 is configured to determine where, within the autonomous light assembly's region of interest, the object is located. Stated differently, object detection module 222 may determine a position of the identified object within a sensing zone of the first object detection device(s) 122. Stated yet another way, object detection module 222 may determine a position of the identified object based on where the identified object is located relative to an X axis boundary, a Y axis boundary, and a Z axis boundary of the sensing zone of the first object detection device(s) 122. Based on the object's location within the sensing zone, object detection module 222 will then determine a position of first actuation system 202 that while cause first light source 212 to be directed at the object's location. Object detection module 222 may then cause controller 200 to command the first actuation system 202 to actuate to that position, thereby directing the first light source 212 at the identified object.

In accordance with various embodiments, object detection module 222 is configured to track movement of the identify object within the region of interest, and cause controller 200 to send actuation commands to first actuation system 202 that cause first light source 212 to move with the object. In various embodiments, object detection module 222 may determine a center point of the detected object using object feature data stored object database 224 and then cause controller 200 to direct a center axis of the first light source 212 at the center point of the object. For example, objection detection module 222 will compare features of the object image captured by first object detection device(s) 122 to the features of objects stored in object database 224 and, based on the comparison, will adjust the focus of first light source 212. The focus of first light source 212 may be adjusted by controller 200 sending commands to first actuation system 202 and/or to first light source 212.

In various embodiments, object detection module 222 may also determine whether the seat occupant's eyes are closed (i.e., in a closed state) or open (i.e., in an open state) based on object feature data stored in object database 224. If object detection module 222 determines the occupant's eyes are in the closed state for a duration time greater than a threshold duration (e.g., longer than 1 minute, longer than 5 minutes, or any other suitable length of time), the controller 200 may command first light source 212 to turn off (or decrease brightness). Similarly, if first light source 212 is off, and object detection module 224 determines the seat occupant's eyes are in the open state, controller 200 may command first light source 212 to turn on (or increase brightness).

In various embodiments, controller 200 may command first light source 212 to increase its brightness or decrease its brightness based on the ambient light data received from first light sensor(s) 132 and/or based on the type of object identified by object detection module 222. For example, if the brightness of the ambient increases (e.g., due to a window being opened or to the main cabin lights being turned on), controller 200 may command first light source 212 to decrease brightness. If the brightness of the ambient light decreases (e.g., due to a window being closed or to the main cabin lights being turned off), controller 200 may command first light source 212 to increase brightness. By way of another example, if object detection module 222 identifies the object as a display screen (e.g., a tablet, cellular phone, etc.) or other object that is self-illuminated, controller 200 may command the first light source 212 to decrease brightness. If object detection module 222 identifies the object as reading material (e.g., a book, newspaper, magazine, etc.), controller 200 may command the first light source 212 to increase brightness. In this regard, controller 200 may determine at what brightness to set first light source 212 based on both the identified object and the ambient light. In accordance with various embodiments, object detection module 222 may include an object hierarchy, or priority list, such that when more than one object is identified in the region of interest, controller 200 determines on which of the identified objects to focus first light source 212 based on where the objects are listed in the object hierarchy. For example, if a book is higher priority than a down tray table, and a down tray table and a book are identified, then controller 200 will focus firsts light source 212 on the book.

In various embodiments, each reading light assembly may include one or more manual override(s). For example, first reading light assembly 112 includes manual override(s) 192, second reading light assembly 114 includes manual override(s) 194, and third reading light assembly 114 includes manual override 196. Manual overrides 192, 194, 196 may include buttons, knobs, switches, touchscreen, or any other input device that allows a seat occupant to change the brightness and/or position of first light source 212.

In accordance with various embodiments, operation of the object detection module 222 is based on various machine learning models or deep learning models configured to detect the presence of anomalous or suspicious behavior or activity. The various machine learning models may comprise, for example, a Viola-Jones object detection model, a scale-invariant feature transformation model, or a histogram of oriented gradients model. The various deep learning models may comprise, for example, a You Only Look Once (YOLO) model, any of the class of object proposal models (e.g., R-CNN, Fast R-CNN, Faster R-CNN or Cascade R-CNN) or various neural network models, including, for example, a single-shot refinement neural network for object detection model. The resulting system is thus self-learning, meaning the object database 224 is continually updated through each operation. Initial operation of the system may employ pre-defined image data sets compiled from various sources (e.g., photographs taken from online sources). The systems disclosed herein may be retrofitted to reading light assemblies without extensive modifications to existing hardware or software and may be readily upgraded as improvements to machine learning models or deep learning models are made.

While autonomous light system 100 is illustrated as including three (3) autonomous light assemblies (e.g., first, second, third autonomous light assemblies 102, 104, 106) corresponding to three (3) seats in one (1) row of cabin 50, it is contemplated and understood that autonomous light system 100 may include any number of autonomous light assemblies similar to first, second, third autonomous light assemblies 102, 104, 106, in any number of rows, and that controller 200 may be operably coupled to each and/or all of the autonomous light assemblies. In this regard, a single controller and/or single object detection module and/or a single object database may be employed to control all the autonomous light assemblies in autonomous light system 100.

Figure 3:
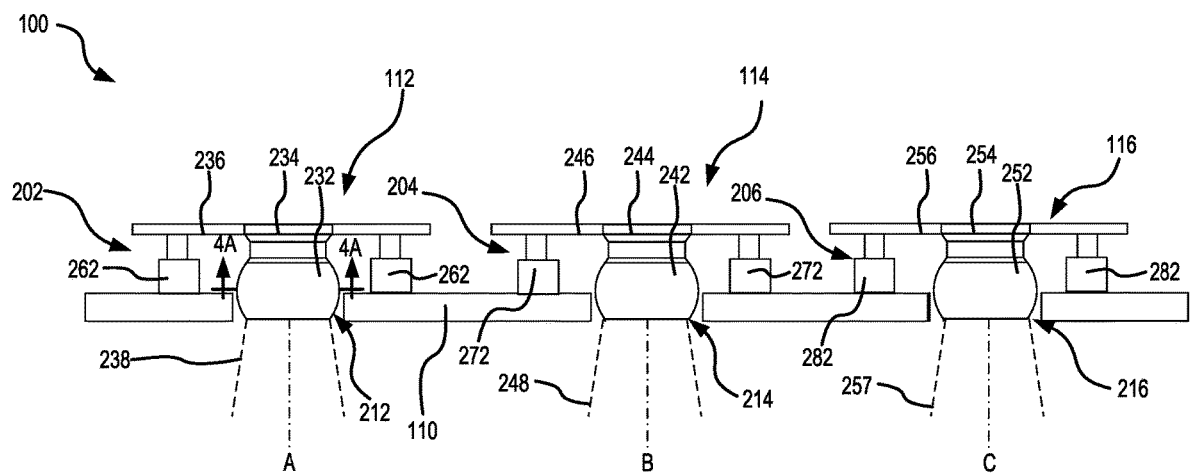
FIG. 3 illustrates reading light assemblies of an autonomous light assembly, in accordance with various embodiments.
Figure 4A:
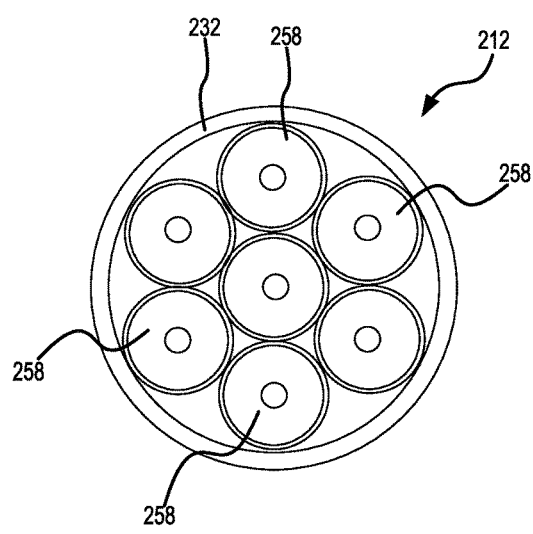
FIGS. 4A and 4B illustrate a light source and an actuation system, respectively, of a first reading light assembly in FIG. 3, in accordance with various embodiments.

With reference to FIG. 3, additional details of first reading light assembly 112, second reading light assembly 114, and third reading light assembly 116 are illustrated. First reading light assembly 112 includes first light source 212. FIG. 4A illustrates a cross-section view of first light source 212 taken along the line 4A-4A in FIG. 3. With combined reference to FIG. 3 and FIG. 4A, first light source 212 may include a plurality of lights 258. Lights 258 may include halogen lamps, light emitting diodes, incandescent lamps, compact fluorescent lamps, fluorescent tubes, or any other suitable light emitter(s). First light source 212 includes a first light housing 232. Lights 258 are housed (e.g., located) in first light housing 232. In various embodiments, an outer perimeter of first light housing 232 may have a generally spherical shape. In various embodiments, an outer perimeter of first light housing 232 may be cylindrical. In accordance with various embodiments, controller 200 (FIG. 2) may change the brightness of first light source 212 by increasing or decreasing the number of lights 258 turned on and/or by changing an intensity of the light emitted from one or more of lights 258.

A base 234 of first light housing 232 is coupled to a first actuation plate 236 of first actuation system 202. In accordance with various, first actuation system 202 includes one or more actuator(s) 262 coupled to first actuation plate 236. Actuators 262 may include electromechanical actuators, hydraulic actuators, pneumatic actuators, linear actuators, rotary actuators, magnetic actuators, or any other suitable actuator or combination of actuators.

Figure 4B:
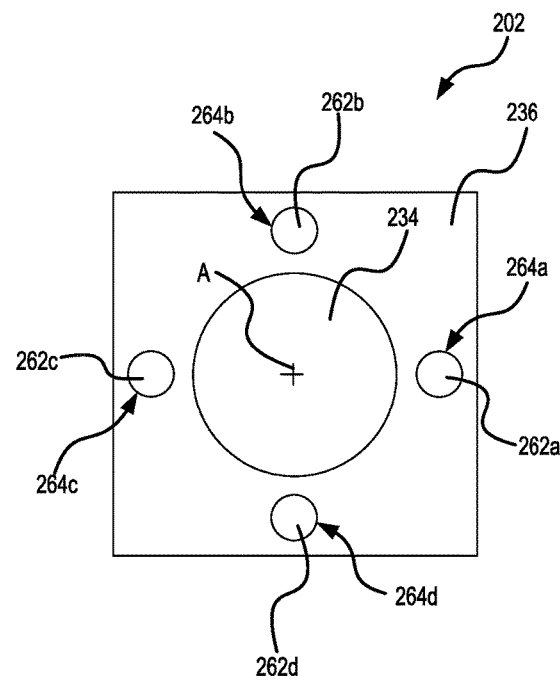

With additional reference to FIG. 4B, in various embodiments, first actuation system 202 may include a first actuator 262a coupled to a first attachment region 264a of first actuation plate 236, a second actuator 262b coupled to a second attachment region 264b of first actuation plate 236, a third actuator 262c coupled to a third attachment point 264c of first actuation plate 236, and a fourth actuator 262d coupled to a fourth attachment point 264d of first actuation plate 236. First actuator 262a, second actuator 262b, third actuator 262c, and fourth actuator 262d are each coupled between first actuation plate 236 and a stationary structure. In various embodiments, first actuator 262a, second actuator 262b, third actuator 262c, and fourth actuator 262d are coupled between first actuation plate 236 and PSU 110. In various embodiments, first actuator 262a, second actuator 262b, third actuator 262c, and fourth actuator 262d may be located approximately 90° apart from one another about a center axis A of first light source 212. As used in the previous context, "approximately" means±10° from normal. Center axis A is the center of the light cone 238 (FIG. 3) emitted by first light source 212.

In accordance with various embodiments, controller 200 (FIG. 2) is configured to send actuation command to first actuator 262a, second actuator 262b, third actuator 262c, and fourth actuator 262d to control the position of light cone 238. For example, controller 200 may send actuation commands to first actuator 262a, second actuator 262b, third actuator 262c, and fourth actuator 262d that change a distance between the region of first actuation plate 236 to which the actuator is coupled and a stationary structure (e.g., PSU 110). Actuation of one or more of first actuator 262a, second actuator 262b, third actuator 262c, and fourth actuator 262d changes a position (e.g., a tilt or an angle) of first actuation plate 236, thereby changing a position (e.g., a tilt or an angle) of first light source 212. Stated differently, translation of first actuation plate 236 changes the position (e.g., tilt or angle) of base 234, first light housing 232, and lights 258. Changing the position of first light source 212 changes the position of the light cone 238 emitted by lights 258.

Figure 5A:
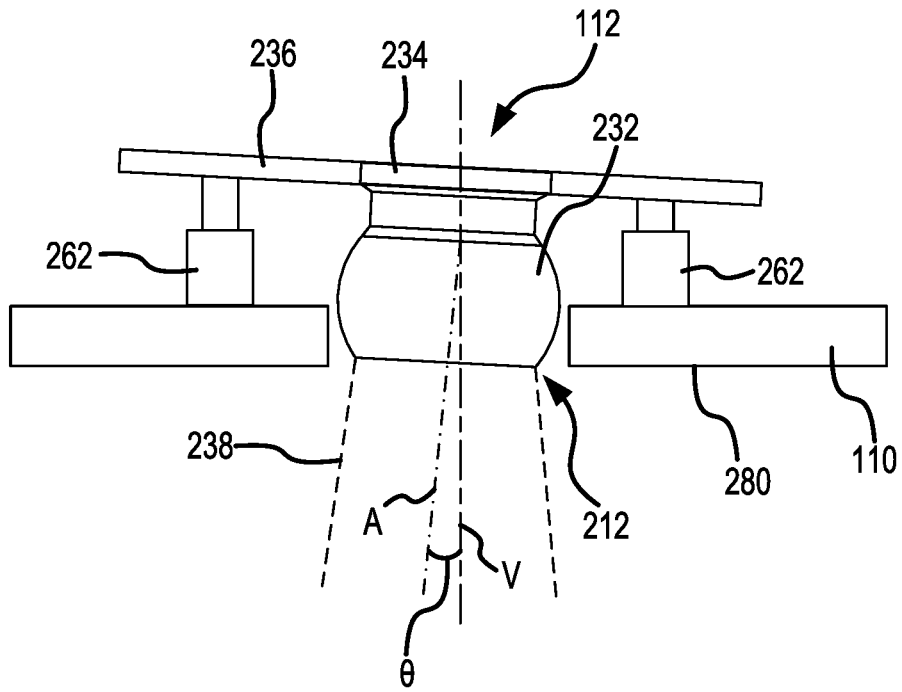
FIGS. 5A and 5B illustrate translation of a light source via actuating an actuation system of a reading light assembly for an autonomous light system, in accordance with various embodiments.
Figure 5B:
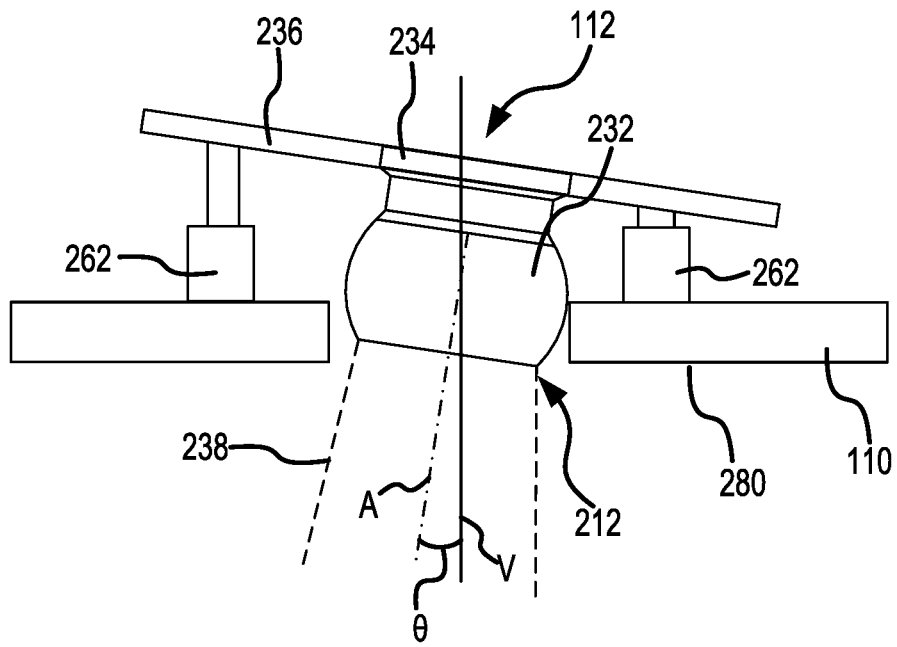

For example, with reference to FIGS. 5A and 5B, actuation of one or more of actuators 262 changes the angle theta ($\theta$) of center axis A of first light source 212 relative to an axis V. Axis V is may be approximately normal to surface 280 of PSU 110. As used in the previous context, "approximately normal" means±10° from normal. In accordance with various embodiments, after determining the angle $\theta$ needed to direct first light source 212 at an object identified by object detection module 222 (i.e., after determining a "target light source angle $\theta$"), controller 200 may compare the target light source angle $\theta$ to a limit angle for first light source 212. With combined reference to FIGS. 1, 2, and 5A, the limit angle is configured to keep the light cone 238 of first light source 212 within the region of interest of first autonomous light assembly 102. For example, if light source first is oriented at an angle $\theta$ less than or equal to the limit angle, light cone 238 will remain between armrest 144 and armrest 146 and between seatback 148 and the back surface of the seat directly in front of first seat 60. If first light source 212 is oriented at an angle $\theta$ greater than the limit angle, light cone 238 may shine on second seat 62, on the seat behind first seat 60 and/or on the seat in front of first seat 60. In this regard, controller 200 is configured to minimize the probability that light emitted from first light source 212 will bother the occupant, and/or encroach in the area, of second seat 62 and/or the area of seats behind and in front of first seat 60. Controller 200 may thus be configured to send actuation commands to actuators 262 that will locate first light source 212 at positions where angle $\theta$ is equal to, but not greater than, the limit angle. Stated differently, if the target angle $\theta$ is greater than the limit angle, controller 200 will locate first light source 212 at a position wherein angle $\theta$ is equal to the limit angle. It is contemplated and understood that controller 200 is configured to control the positioning of second light source 214 and third light source 216 (e.g., the actuation commands sent to second actuation system 204 and to third actuation system 206) in a manner similar to the manner described above with reference to first light source 212 and first actuation system 202.

Returning to FIG. 3, second reading light assembly 114 includes second light source 214. Second light source 214 includes a second light housing 242 and a plurality of lights, similar to lights 258 of first light source 212, located in the second light housing 242. A base 244 of second light housing 242 is coupled to a second actuation plate 246 of second actuation system 204. Second actuation system 204 incudes one or more actuators 272 coupled to second actuation plate 246. In various embodiments, actuators 272 may be positioned 90° apart from one another about center axis B of second light source 214, similar to first actuator 262a, second actuator 262b, third actuator 262c, and fourth actuator 262d in FIG. 4B. Actuators 272 may include electromechanical actuators, hydraulic actuators, pneumatic actuators, linear actuators, rotary actuators, magnetic actuators, or any other suitable actuator or combination of actuators.

Actuation of one or more of actuators 272 changes a position (e.g., tilt or angle) of second actuation plate 246, thereby changing a position (e.g., tilt or angle) of second light source 214. Stated differently, translation of second actuation plate 246 changes the position (e.g., tilt or angle) of base 244, second light housing 242, and the lights located in second light housing 242. Changing the position of second light source 214 changes the position of the light cone 248 emitted by the lights of second light source (e.g., changes the angle of center axis B). The actuators 272 of second actuation system 204 are coupled between second actuation plate 246 and a stationary structure. In various embodiments, actuators 272 are coupled between second actuation plate 246 and PSU 110.

Third reading light assembly 116 includes third light source 216. Third light source 216 includes a third light housing 252 and a plurality of lights, similar to lights 258 of first light source 212, located in the third light housing 252. A base 254 of third light housing 252 is coupled to a third actuation plate 256. Third actuation system 206 incudes one or more actuators 282 coupled to third actuation plate 256. In various embodiments, actuators 282 may be positioned 90° apart from one another about center axis C of third light source 216, similar to first actuator 262a, second actuator 262b, third actuator 262c, and fourth actuator 262d in FIG. 4B. Actuators 282 may include electromechanical actuators, hydraulic actuators, pneumatic actuators, linear actuators, rotary actuators, magnetic actuators, or any other suitable actuator or combination of actuators.

Actuation of one or more of actuators 282 of third actuation system 206 changes a position (e.g., tilt or angle) of third actuation plate 256, thereby changing a position (e.g., tilt or angle) of third light source 216. Stated differently, translation of third actuation plate 256 changes the position (e.g., tilt or angle) of base 254, third light housing 252, and the lights located in third light housing 252. Changing the position of third light source 216 changes the position of the light cone 257 emitted by the lights of third light source (e.g., changes the angle of center axis C of third light source 216). The actuators 282 of third actuation system 206 are coupled between third actuation plate 256 and a stationary structure. In various embodiments, the actuators 282 of third actuation system 206 are coupled between third actuation plate 256 and PSU 110.

Figure 6A:
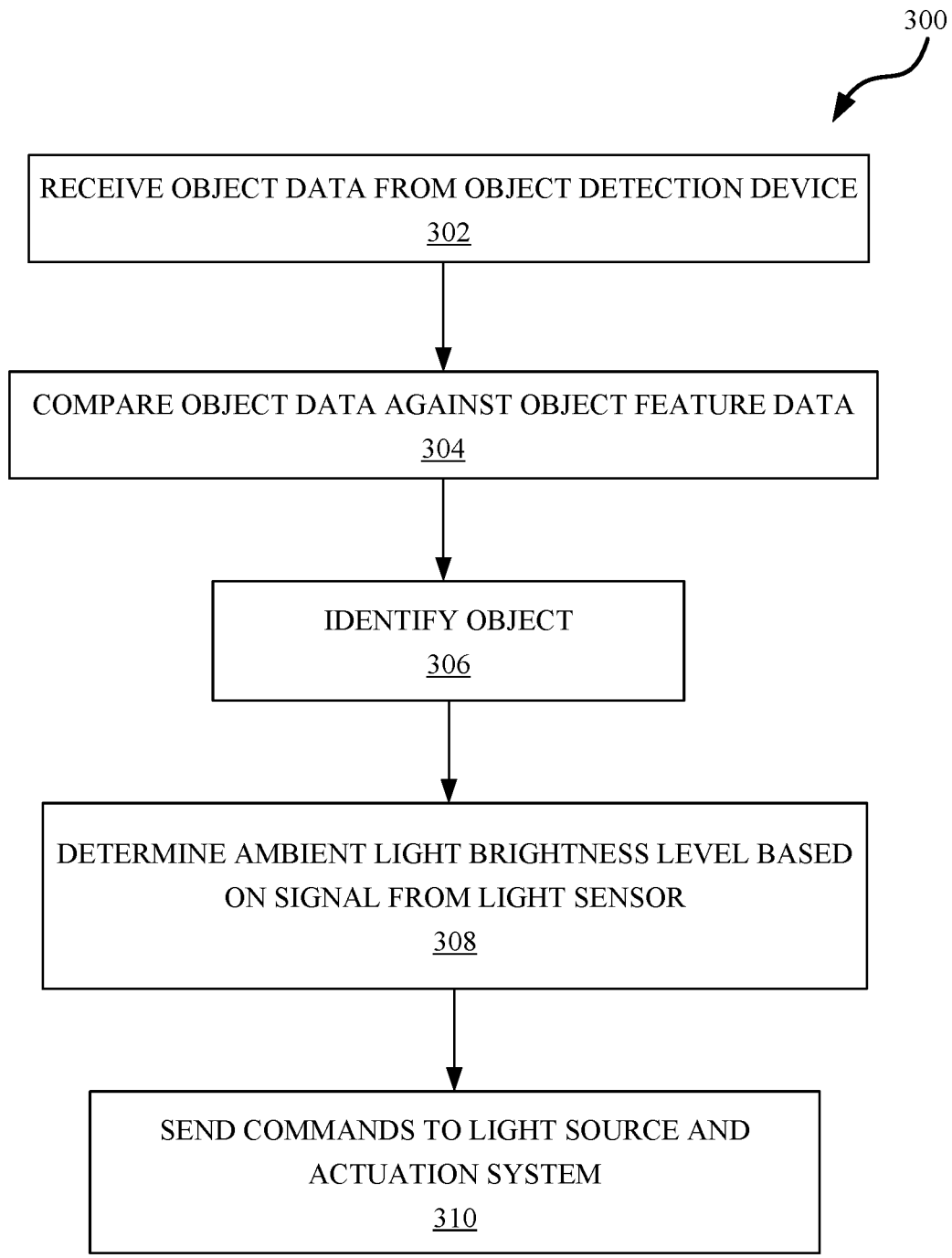
FIGS. 6A, 6B, and 6C illustrate a flowchart describing a method used for controlling an autonomous light system, in accordance with various embodiments.

With reference to FIG. 6A, a method 300 of controlling autonomous light system 100 is illustrated. Method 300 may be carried out by controller 200. In accordance with various embodiments, method 300 may include receiving object data from an object detection device (step 302), comparing the object data against object feature data located in an object database (step 304), identifying an object based on the comparison of the object data to the object feature data (step 306), determining an ambient light level based on a signal received from an ambient light sensor (step 308), and a sending command(s) to at least one of a light source or an actuation system based on the ambient light level and the object identified in step 306 (step 310).

With combined reference to FIG. 6A and FIG. 2, in various embodiments, step 302 may include controller 200 receiving object data from first object detection device 122. The first object detection device 122 may monitor a first region of interest. Step 304 may include controller 200 (e.g., object detection module 222) comparing the object data received from first object detection device 122 against object feature data stored in object database 224. Step 306 may include controller 200 (e.g., object detection module 222) identifying an object located in the first region of interest based on the comparison of the object data to the object feature data. Step 308 may include controller 200 determining a level of ambient light in the first region of interest based on a signal received from first light sensor 132. Step 310 may include controller 200 sending actuation commands to first actuation system 202 based on the level ambient light and the object identified by the comparison of the object data from first object detection device 122 to the object feature data (i.e. by the object identified by object detection module 222). Step 310 may include controller 200 sending brightness level commands to first light source 212 based on the ambient light brightness and the object identified.

Figure 6B:
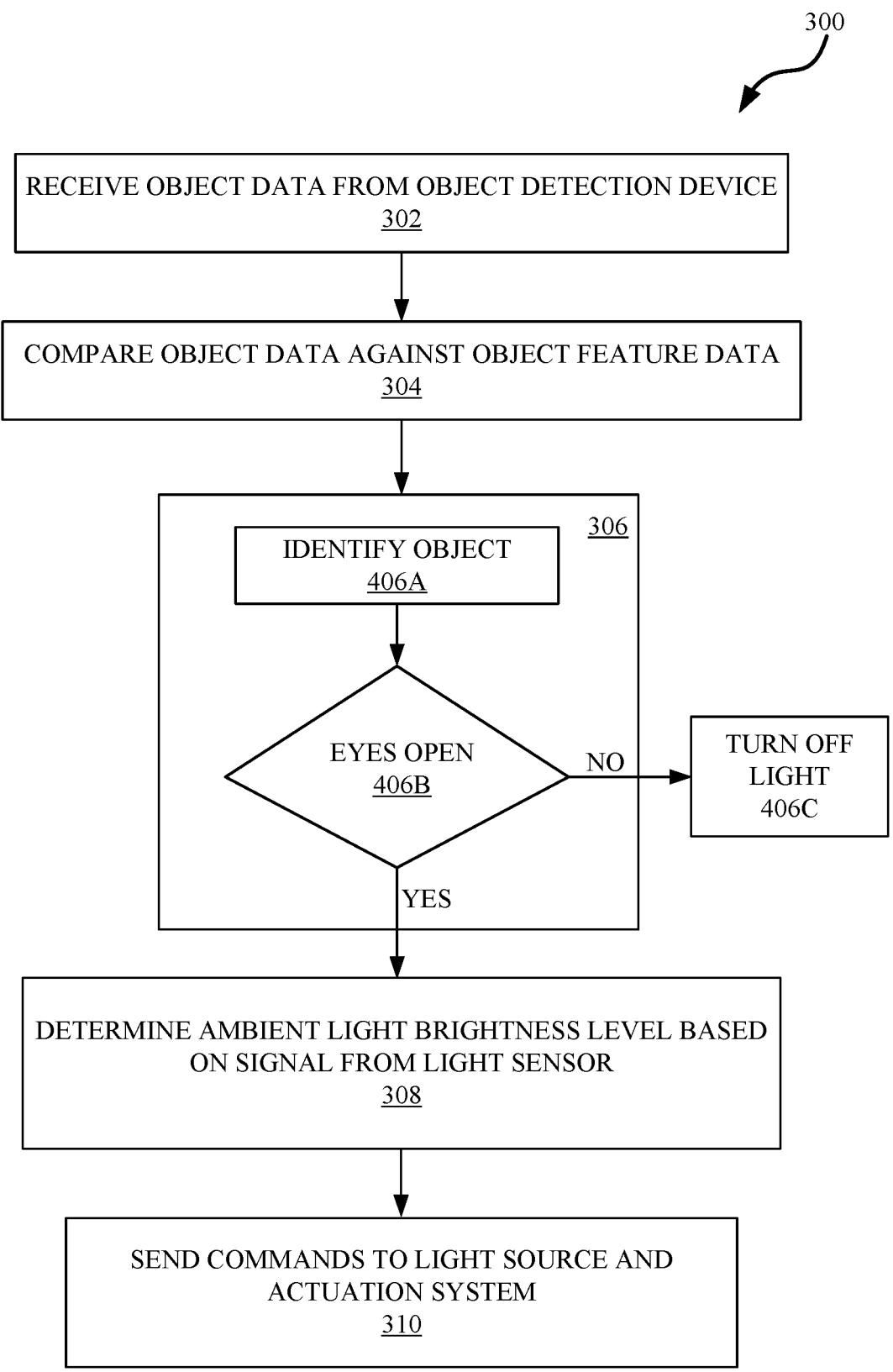

With reference to FIG. 6B, in various embodiments, step 306 may include identifying an object in the first region of interest (step 406A) and determining if the eyes of a seat occupant in the first region of interest are in an open state or a closed state (step 406B). The object and the state of the seat occupant's eyes may both be identified/determined by comparing the object data received from the first object detection device to object feature data stored in the object database. If the controller determines the eyes are in an open state, the controller may proceed with step 308 (e.g., the controller may determine the ambient light level. If the controller determines the eyes are in a closed state, the controller may send a command to turn off the light source (step 406C).

Figure 6C:
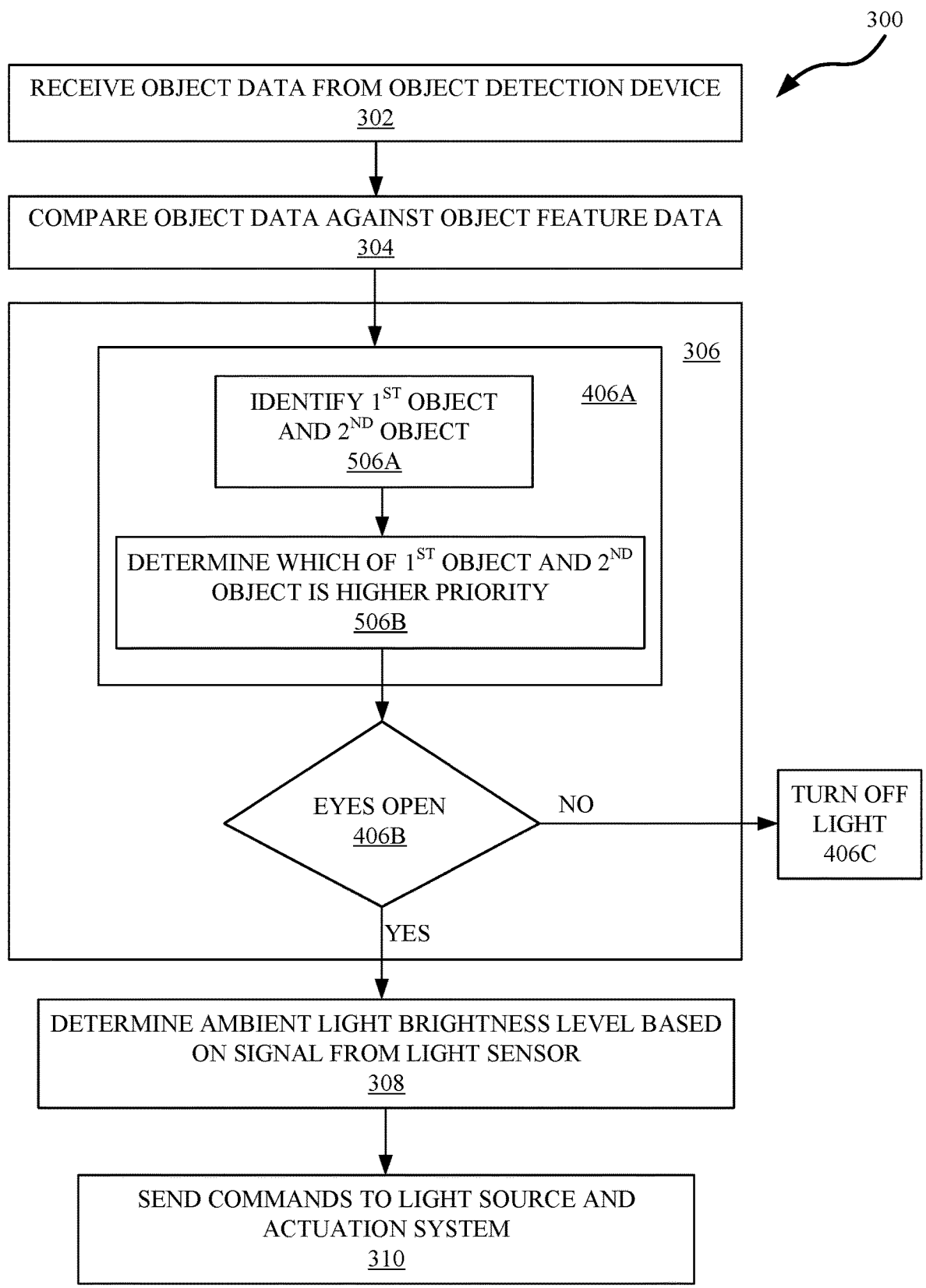

With reference to FIG. 6C, in various embodiments, step 406A may include identifying multiple objects in the first region of interest (step 506A) and determining which of the identified objects is a highest priority (step 506B). For example, step 506A may include identifying a first object and a second object in the first region of interest. The first object and the second object may both be identified by comparing the object data received from the first object detection device to object feature data stored in the object database. Step 506B may include determining which of the first object and the second object is a higher priority. The commands sent to the light source and the actuation system (step 310) may be based on which of the first object and the second object is determined to be the higher priority object.

The system and methods described herein may be described in terms of functional block components, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, VBScript, COBOL, MICROSOFT® Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like.

Benefits, other advantages, and solutions to problems have been described herein with regard to specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An autonomous light system, comprising:
   a reading light assembly including a light source and an actuation system configured to change a positioning of the light source, wherein the actuation system comprises:
      an actuation plate coupled to the light source;
      a first actuator configured to translate the actuation plate; and
      a second actuator configured to translate the actuation plate;
   an object detection device;
   a controller operably coupled to the light source and the object detection device, the controller including an object detection module; and
   a tangible, non-transitory memory configured to communicate with the controller, the tangible, non-transitory memory having instructions stored thereon that, in response to execution by the controller, cause the controller to perform operations comprising:
      receiving, by the controller, object data from the object detection device;
      comparing, by the controller, the object data against object feature data stored in an object database;
      identifying, by the controller, an object based on the comparison of the object data to the object feature data; and
      sending, by the controller, a first command to at least one of the light source and the actuation system.

2. The autonomous light system of claim 1, wherein the object identified by the controller is at least one of a book, a magazine, a tray table in a down position, a newspaper, and an electronic display.

3. The autonomous light system of claim 1, wherein identifying, by the controller, the object based on the comparison of the object data against the object database comprises determining, by the controller, if a seat occupant's eyes are in an open state or a closed state.

4. The autonomous light system of claim 3, wherein if the controller determines the seat occupant's eyes are closed, the first command causes the light source to turn off.

5. The autonomous light system of claim 1, further comprising an ambient light sensor in operable communication with the controller.

6. The autonomous light system of claim 5, wherein the operations further comprise:
   receiving, by the controller, light data from the ambient light sensor; and
   sending, by the controller, at least one of an increase brightness command and a decrease brightness command to the light source based on the light data.

7. The autonomous light system of claim 1, wherein sending, by the controller, the first command to the at least one of the light source and the actuation system comprises commanding, by the controller, the light source to follow the object.

8. The autonomous light system of claim 7, wherein commanding, by the controller, the light source to follow the object comprises sending, by the controller, actuation commands to the actuation system.

9. The autonomous light system of claim 8,
wherein the second actuator is located approximately 90° apart from the first actuator relative to a center axis of the light source and wherein the actuation system comprises:
 a third actuator configured to translate the actuation plate, wherein the third actuator is located approximately 180° apart from the first actuator relative to the center axis of the light source; and
 a fourth actuator configured to translate the actuation plate, wherein the fourth actuator is located approximately 180° apart from the second actuator relative to the center axis of the light source.

10. An article of manufacture including a tangible, non-transitory computer-readable storage medium having instructions stored thereon for controlling an autonomous light assembly that, in response to execution by a controller, cause the controller to perform operations comprising:
 receiving, by the controller, object data from an object detection device;
 comparing, by the controller, the object data against an object feature data stored in an object database;
 identifying, by the controller, an object based on the comparison of the object data to the object feature data;
 determining, by the controller, an ambient light brightness level based on a signal received from an ambient light sensor; and
 sending, by the controller, a first command to at least one of a light source and an actuation system based on the ambient light brightness level and the object identified by the comparison of the object data to the object feature data, wherein sending, by the controller, the first command to the at least one of the light source and the actuation system comprises:
  commanding, by the controller, the light source to follow the object, wherein commanding, by the controller, the light source to follow the object further comprises:
   determining, by the controller, an angle of a center axis of the light source relative to an axis; and
   comparing, by the controller, the angle to a limit angle.

11. The article of manufacture of claim 10, wherein the object identified by the controller is at least one of a book, a magazine, a newspaper, a tray table in a down position, and an electronic display.

12. The article of manufacture of claim 10, wherein identifying, by the controller, the object based on the comparison of the object data to the object database comprises determining, by the controller, if a seat occupant's eyes are in an open state or a closed state.

13. The article of manufacture of claim 12, wherein sending, by the controller, the first command comprises at least one of:
 sending, by the controller, an increase brightness command to the light source if the eyes are in the open state; and
 sending, by the controller, a decrease brightness command to the light source if the eyes are in the closed state.

14. The article of manufacture of claim 10, wherein sending, by the controller, the first command comprises at least one of:
 sending, by the controller, an increase brightness command to the light source if the object is at least one of a book or a magazine; and
 sending, by the controller, a decrease brightness command to the light source if the object comprises an electronic display.

15. The article of manufacture of claim 10, wherein commanding, by the controller, the light source to follow the object comprises sending, by the controller, actuation commands to the actuation system.

16. A reading light assembly of an autonomous light system, the reading light assembly comprising:
 a light source; and
 an actuation system configured to control a position of the light source based on commands received from a controller of the autonomous light system, wherein the actuation system includes:
 an actuation plate coupled to the light source; and
 a first actuator coupled to the actuation plate.

17. The reading light assembly of claim 16,
wherein translation of the actuation plate changes the position of the light source.

18. The reading light assembly of claim 17, wherein the actuation system further includes:
 a second actuator coupled to the actuation plate, wherein the second actuator is located approximately 90° apart from the first actuator relative to a center axis of the light source;
 a third actuator coupled to the actuation plate, wherein the third actuator is located approximately 180° apart from the first actuator relative to the center axis of the light source; and
a fourth actuator coupled to the actuation plate, wherein the fourth actuator is located approximately 180° apart from the second actuator relative to the center axis of the light source.

* * * * *